United States Patent
Mitsui et al.

(10) Patent No.: US 8,663,861 B2
(45) Date of Patent: Mar. 4, 2014

(54) FUEL CELL SYSTEM AND CONTROL METHOD THEREFOR

(75) Inventors: Masaki Mitsui, Kyoto (JP); Takashi Akiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 245 days.

(21) Appl. No.: 13/321,062

(22) PCT Filed: Jan. 24, 2011

(86) PCT No.: PCT/JP2011/000342
§ 371 (c)(1),
(2), (4) Date: Nov. 17, 2011

(87) PCT Pub. No.: WO2011/118111
PCT Pub. Date: Sep. 29, 2011

(65) Prior Publication Data
US 2012/0064425 A1 Mar. 15, 2012

(30) Foreign Application Priority Data
Mar. 26, 2010 (JP) .................................. 2010-072823

(51) Int. Cl.
*H01M 8/04* (2006.01)
(52) U.S. Cl.
USPC ............ 429/431; 429/444; 429/448; 429/449
(58) Field of Classification Search
None
See application file for complete search history.

(56) References Cited

U.S. PATENT DOCUMENTS

| | | | | |
|---|---|---|---|---|
| 8,062,804 B2 * | 11/2011 | Daly et al. | ..................... | 429/443 |
| 2007/0082244 A1 * | 4/2007 | Kuriiwa | .......................... | 429/23 |
| 2008/0131743 A1 * | 6/2008 | Cornet et al. | ................... | 429/17 |
| 2009/0186257 A1 | 7/2009 | Sakai et al. | | |
| 2010/0173212 A1 | 7/2010 | Senoue et al. | | |

FOREIGN PATENT DOCUMENTS

| | | |
|---|---|---|
| JP | 11-195423 | 7/1999 |
| JP | 2004-152741 | 5/2004 |
| JP | 2004-164909 | 6/2004 |
| JP | 2006-164741 | 6/2006 |
| JP | 2006-309979 | 11/2006 |
| JP | 2007-080708 | 3/2007 |
| JP | 2009-021194 | 1/2009 |
| JP | 2009-087741 | 4/2009 |

* cited by examiner

*Primary Examiner* — John S Maples
(74) *Attorney, Agent, or Firm* — McDermott Will & Emery LLP (57) ABSTRACT

The amount of fuel supplied to a fuel cell is set to a second set value Qm2 smaller than a first set value Qm1 determined based on a load. Then, an output current Ifcr of the fuel cell with the fuel supply amount set to the second set value Qm2 is detected. The output current Ifcr is compared with a reference value Iref for determining mild deterioration to determine whether the fuel cell has deteriorated from the comparison result. If a determination that the fuel cell has deteriorated is made, the fuel supply amount is reset to a third set value Qm3 larger than the second set value Qm2.

11 Claims, 7 Drawing Sheets

FUEL CELL SYSTEM AND CONTROL METHOD THEREFOR

RELATED APPLICATIONS

This application is the U.S. National Phase under 35 U.S.C. §371 of International Application No. PCT/JP2011/000342, filed on Jan. 24, 2011, which in turn claims the benefit of Japanese Application No. 2010-072823, filed on Mar 26, 2010 the disclosures of which Application are incorporated by reference herein.

TECHNICAL FIELD

This invention relates to a fuel cell system, and particularly to a technique for heightening the efficiency of a fuel cell system.

BACKGROUND ART

Recently, electronic devices are rapidly becoming portable and cordless. Such portable electronic devices usually include secondary batteries as the power source for driving the devices. There is thus demand for development of secondary batteries which are small and light-weight and have high energy density.

However, in order for secondary batteries to be used as the power source for driving portable and other devices, the secondary batteries need to be charged. While they are being charged, the devices cannot be carried for use. As such, fuel cells are attracting attention because they can be continuously used as the power source for a long time if only they get refueled.

Fuel cells typically have a stack of unit cells (cell stack). Each unit cell includes a membrane electrode assembly (MEA) comprising an anode, a cathode, and an electrolyte membrane interposed therebetween. The cell stack is composed of a plurality of MEAs stacked with conductive separators interposed therebetween. Both ends of the cell stack in the stacking direction are fitted with end plates. A fuel is supplied to the anode of each unit cell, while an oxidant is supplied to the cathode.

Among fuel cells, direct methanol fuel cells (DMFCs) in particular are under active development. DMFCs use methanol, which is in liquid form at room temperature, as the fuel. Therefore, compared with fuel cells that use, for example, hydrogen, which is in gaseous form at room temperature and normal pressure, as the fuel, DMFCs can easily reduce the size and weight of their fuel supply system. Therefore, by using a DMFC as a power source, it is possible to realize a portable device with good transportability. Also, the fuel can be easily resupplied.

However, DMFCs require time to stabilize the oxidation reduction reaction, which makes it difficult to promptly adjust the amount of power generation in response to load variations. Therefore, in a power supply apparatus using a DMFC, it is desirable to respond to load variations by operating the fuel cell at the point at which the largest power can be generated and storing surplus electrical output in a storage battery.

From such a viewpoint, a fuel cell system has been proposed in which the voltage and current of a fuel cell are constantly measured and the fuel cell is operated at the output voltage and output current at which the largest output can be obtained (e.g., see PTL 1).

CITATION LIST

Patent Literature

PTL 1: Japanese Laid-Open Patent Publication No. 2004-152741

SUMMARY OF INVENTION

Technical Problem

Figure 7:
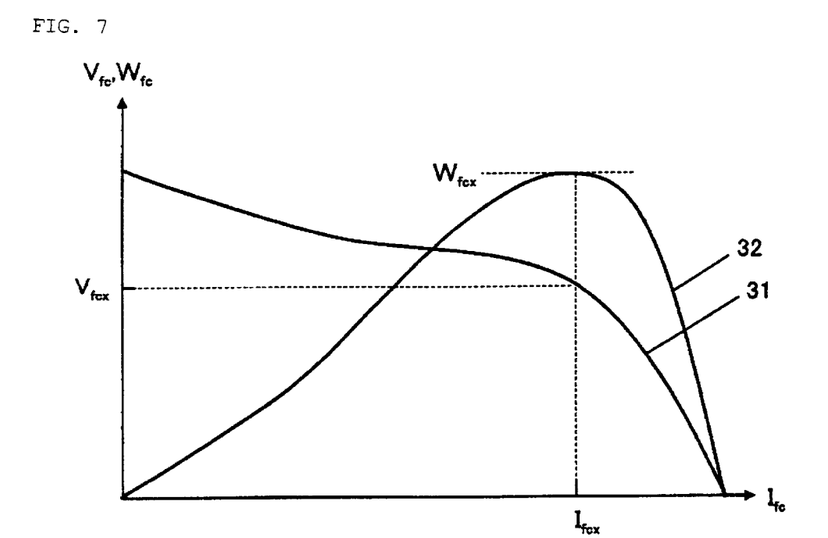
FIG. 7 is a graph showing the voltage-current characteristics of a fuel cell and the relation between the amount of power generated and current.

However, in order to allow a fuel cell to produce the largest output, it is necessary to make the output voltage of the fuel cell lower than the largest output voltage (see FIG. 7). In this case, the output current increases and, as a result, the anode overvoltage and the cathode overvoltage increase. Therefore, the overvoltage loss of the fuel cell increases, and the power generation efficiency lowers.

Figure 8:
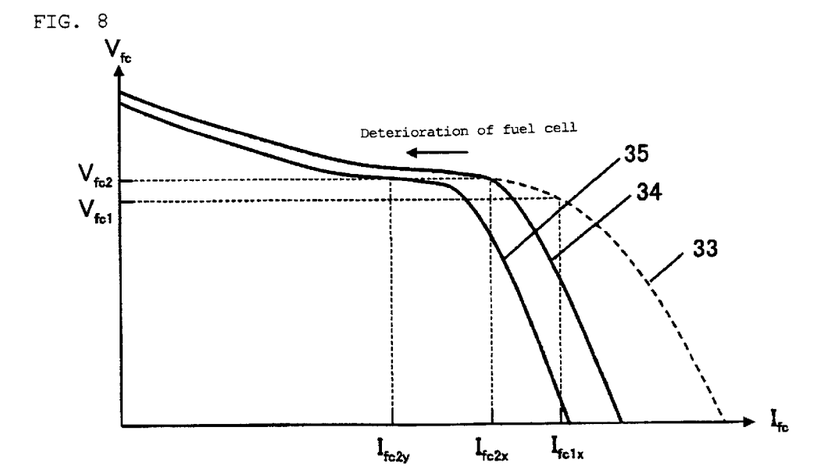
FIG. 8 is a graph showing a change in voltage-current characteristics due to deterioration of the fuel cell.

On the other hand, if the output voltage is heightened to reduce the overvoltage loss, the output lowers sharply when the fuel cell deteriorates (see FIG. 8). Therefore, in this case, the fuel cell cannot be stably operated for a long period of time.

It is therefore an object of the invention to heighten the efficiency of a fuel cell and stabilize long-term power supply by determining the degree of deterioration of the fuel cell appropriately and setting the operating conditions according to the determined degree of deterioration.

Solution to Problem

An aspect of the invention is directed to a method for controlling a fuel cell system including: a fuel cell having an anode and a cathode; a fuel supply unit for supplying a fuel to the anode; an oxidant supply unit for supplying an oxidant to the cathode; and a current sensor for detecting an output current of the fuel cell. The control method includes the steps of:

(a) setting the amount of fuel supplied to the fuel cell by the fuel supply unit to a second set value Qm2 smaller than a first set value Qm1 determined based on a load;

(b) detecting an output current Ifcr of the fuel cell with the fuel supply amount set to the second set value Qm2;

(c) comparing the output current Ifcr with a reference value Iref for determining mild deterioration to determine whether the fuel cell has deteriorated; and (d) in the case of determining that the fuel cell has deteriorated, resetting the fuel supply amount to a third set value Qm3 larger than the second set value Qm2.

Another aspect of the invention is directed to a fuel cell system including: a fuel cell having an anode and a cathode; a fuel supply unit for supplying a fuel to the anode; an oxidant supply unit for supplying an oxidant to the cathode; a fuel controller for controlling the fuel supply unit; an oxidant controller for controlling the oxidant supply unit; a voltage controller for controlling an output voltage of the fuel cell; a current sensor for detecting an output current of the fuel cell, and a storage unit for storing (i) the relation between the amount of fuel supplied and a load and (ii) a reference current value Iref indicating deterioration of the fuel cell. The fuel controller is configured to set, based on the above relation (i), the fuel supply amount to a first set value Qm1 determined based on the load. The voltage controller is configured to set the output voltage of the fuel cell to: a voltage Vfc1 at which the amount Wfc of power generated by the fuel cell becomes greatest with the fuel supply amount set to the first set value Qm1; and then a voltage Vfc2 higher than the voltage Vfc1 by a first predetermined rate Pr1. The current sensor is configured to detect: an output current Ifc1 of the fuel cell with the output voltage set to the voltage Vfc1; and an output current Ifc2 of the fuel cell with the output voltage set to the voltage Vfc2. The fuel controller is configured to: based on the ratio between Ifc1 and Ifc2, set the fuel supply amount to a second set value Qm2 smaller than the first set value Qm1; compare an output current Ifcr of the fuel cell detected by the current sensor with the fuel supply amount set to the second set value Qm2, with a reference value Iref; based on the comparison result, determine whether the fuel cell has deteriorated; and in the case of determining that the fuel cell has deteriorated, set the fuel supply amount to a third set value Qm3 larger than the second set value Qm2.

Advantageous Effects of Invention

According to the invention, it is possible to heighten the efficiency of a fuel cell and stabilize long-term power supply.

DESCRIPTION OF EMBODIMENTS

In the method for controlling a fuel cell system according to the invention, when the degree of deterioration of the fuel cell is small and sufficient power can be generated from a relatively small amount of fuel supply, the fuel supply amount is set to a relatively small value. Thus, the amount of fuel consumed by the fuel cell can be reduced.

On the other hand, if the fuel cell has deteriorated mildly and sufficient power cannot be generated from a relatively small amount of fuel supply, the fuel supply amount is increased to generate necessary power. Thus, even after the fuel cell has deteriorated mildly, the fuel cell can be operated to generate sufficient power.

That is, the method for controlling a fuel cell system according to the invention includes: a fuel cell having an anode and a cathode; a fuel supply unit for supplying a fuel to the anode; an oxidant supply unit for supplying an oxidant to the cathode; and a current sensor for detecting an output current of the fuel cell. This method includes the steps of:

(a) setting the amount of fuel supplied to the fuel cell by the fuel supply unit to a second set value Qm2 smaller than a first set value Qm1 determined based on a load;

(b) detecting an output current Ifcr of the fuel cell with the fuel supply amount set to the second set value Qm2;

(c) comparing the output current Ifcr with a reference value Iref for determining mild deterioration to determine whether the fuel cell has deteriorated; and (d) in the case of determining that the fuel cell has deteriorated, resetting the fuel supply amount to a third set value Qm3 larger than the second set value Qm2.

If a determination that the fuel cell has deteriorated is not made in the step (c), the operation is continued with the fuel supply amount unchanged from Qm2.

The first set value Qm1 as used herein is a usual amount of fuel supplied when the fuel cell is operated at the output voltage and output current at which the amount of power generated becomes greatest. Conventional fuel cells are usually operated at the first set value Qm1 throughout the period from the deterioration-free initial state to immediately before deterioration. Contrary to this, the second set value Qm2 is the amount of fuel supplied, characteristics of the invention, which is set to operate a deterioration-free fuel cell in the initial state at an output voltage and an output current to improve power generation efficiency, preferably, to maximize power generation efficiency.

The reference value Iref for mild deterioration determination is a reference value of output current for determining whether the fuel cell has deteriorated mildly. As used herein, mild deterioration refers to such a degree of deterioration that sufficient power cannot be supplied to the load if the fuel supply amount remains unchanged from the second set value Qm2, but sufficient power can be supplied to the load if the fuel supply amount together with the output voltage and output current is adjusted suitably.

The third set value Qm3 refers to the fuel supply amount larger than the second set value Qm2 so that sufficient power can be supplied to the load by adjusting the output voltage and output current suitably.

In an embodiment of the invention, the step (a) includes the steps of:

(e) setting the fuel supply amount to the first set value Qm1;

(f) with the fuel supply amount set to the first set value Qm1, setting the output voltage of the fuel cell to a voltage Vfc1 at which the amount of power generated by, for example, the fuel cell in the initial state becomes greatest;

(g) detecting an output current Ifc1 of the fuel cell when the output voltage of the fuel cell is the voltage Vfc1;

(h) setting the output voltage of the fuel cell to a voltage Vfc2 higher than the voltage Vfc1 by a first predetermined rate Pr1;

(i) detecting an output current Ifc2 of the fuel cell when the output voltage of the fuel cell is the voltage Vfc2; and (j) determining the second set value Qm2 based on the ratio between the output current Ifc1 and the output current Ifc2.

The second set value Qm2 can be set so that Qm2/Qm1=a (Ifc2/Ifc1) where "a" is a positive number. The second set value Qm2 is usually set so that Qm2/Qm1=Ifc2/Ifc1.

According to this configuration, when the degree of deterioration of the fuel cell is small, the fuel cell is operated at the voltage Vfc2 higher than the output voltage Vfc1 at which the amount of power generated becomes greatest, and the fuel supply amount is set based on variation of the output current caused by the operation of the voltage. By heightening the output voltage of the fuel cell, the output current decreases, so that the power generation efficiency is heightened. Therefore, by selecting the voltage Vfc2 suitably, the fuel cell can be operated at the fuel supply amount Qm2 smaller than the fuel supply amount Qm1 determined according to the load without decreasing the amount of power generation so much.

That is, when the degree of deterioration of the fuel cell is small, the output voltage and output current are set to the point at which the power generation efficiency is heightened, not to the point at which the amount of power generation becomes greatest. This can heighten the efficiency of the fuel cell system.

In another embodiment of the invention, the step (d) includes the steps of:

(k) increasing the fuel supply amount by a predetermined amount ΔQ;

(l) with the fuel supply amount increased by the predetermined amount ΔQ, setting the output voltage of the fuel cell to a voltage Vfc3 at which the amount Wfc of power generated by the fuel cell becomes greatest;

(m) detecting an output current Ifc3 of the fuel cell when the output voltage of the fuel cell is the voltage Vfc3; and (n) comparing an amount Wfc3 of power generated by the fuel cell, which is determined from the results of the steps (l) and (m), with an amount Wm of power required by the load. When Wfc3 has reached Wm, the fuel supply amount is maintained. When Wfc3 has not reached Wm, the steps (k) to (n) are repeated within a range of the fuel supply amount not exceeding an upper limit value Qmx. Even when the fuel supply amount has reached the upper limit value Qmx, if Wfc3 has not reached Wm, the operation of the fuel cell can be stopped. Alternatively, the operation of the fuel cell can be continued at the fuel supply amount Qmx unless deterioration is detected in the determination of severe deterioration described below.

According to this configuration, when the fuel cell has deteriorated mildly, the output voltage and output current are set so that the fuel cell is operated at the point at which the amount of power generation becomes greatest, not at the point for high efficiency. And, the fuel supply amount is increased by such a minimum as to compensate for the decrease in the amount of power generation caused by the deterioration of the fuel cell. By this, even after the fuel cell has deteriorated mildly, it is possible to supply power to the load stably while suppressing the amount of fuel consumed by the fuel cell.

In still another aspect of the invention, the step (o) of comparing the voltage Vfc3 with a reference value Vref for determining severe deterioration is further performed. Even when the fuel supply amount has reached the upper limit value Qmx, if Vfc3 does not exceed Vref, the supply of fuel by the fuel supply unit and the supply of oxidant by the oxidant supply unit are stopped.

According to this configuration, even when the fuel cell is operated at the point at which the amount of power generation becomes greatest, if the output voltage does not exceed the reference value due to serious deterioration of the fuel cell, the supply of fuel and oxidant is stopped. Thus, when the deterioration of the fuel cell becomes serious, the operation thereof can be stopped.

In still another embodiment of the invention, instead of the step (o), the step (p) of comparing the amount Wfc3 of power generation with a minimum amount Wmin (Wmin<Wm) of power necessary for the operation of the fuel cell system is further performed. When the fuel supply amount has reached the upper limit value Qmx, if Wfc3 has reached Wmin, the fuel supply amount is maintained at the upper limit value Qmx. Even when the fuel supply amount has reached the upper limit value Qmx, if Wfc3 has not reached Wmin, the supply of fuel by the fuel supply unit and the supply of oxidant by the oxidant supply unit are stopped.

According to this configuration, if the amount of power generated by the fuel cell is greater than the minimum power necessary for the fuel cell system, i.e., the power supplied to the auxiliary devices necessary for the operation of the fuel cell system, the power generation can be continued. Thus, even when the deterioration of the fuel cell is serious, the supply of power to the storage battery or load can be maintained.

The first predetermined rate Pr1 can be set to, for example, 5 to 30%. Since the characteristics of the fuel cells 1 vary from cell to cell, if Pr1 is set to less than 5%, the effect of heightening the efficiency may not be obtained. However, if Pr1 exceeds 30%, the effect of heightening the efficiency is heightened, but the amount Wfc of power generation decreases too much. As a result, the amount of power required by the load 11 may not be supplied.

The reference value Iref for determining mild deterioration can be set to a value which is, for example, 3 to 20% smaller than the current Ifc2 or current Ifcr which was measured in advance by using a not-deteriorating fuel cell in the initial state. In consideration of the variations in the characteristics of the fuel cells 1 and the variations in the performance of auxiliary devices necessary for the operation of the fuel cell system, if the difference therebetween is less than 3%, a wrong determination that the fuel cell has deteriorated may be made. However, if the difference therebetween exceeds 20%, severe deterioration is included, which is not mild deterioration.

Methanol can be used as the fuel, since the invention is particularly suited for direct methanol fuel cells (DMFCs) which use methanol as the fuel. However, the invention is also applicable to the so-called solid polymer electrolyte fuel cells using hydrogen as the fuel, reformed methanol fuel cells, etc.

The first set value Qm1 can be set based on the net amount of fuel stoichiometrically necessary according to the load, the amount of methanol crossover (MCO), and the amount of fuel discharged from the fuel cell without reacting. If the fuel supply amount is excessive, the amount of MCO and the amount of unreacted discharged fuel increase, so the efficiency lowers. On the other hand, if the fuel supply amount is insufficient, necessary power cannot be generated. Therefore, it is preferable to set the first set value Qm1 to a minimum supply amount in consideration of the magnitude of the load, MCO, and unreacted discharged fuel. Further, in the invention, the step of issuing a warning that mild or serious deterioration has been detected can be performed.

Referring to drawings, embodiments of the invention are hereinafter described, taking a direct methanol fuel cell (DMFC) as an example. The invention is not to be construed as being limited to the following embodiments.

(Embodiment 1)

Figure 1:
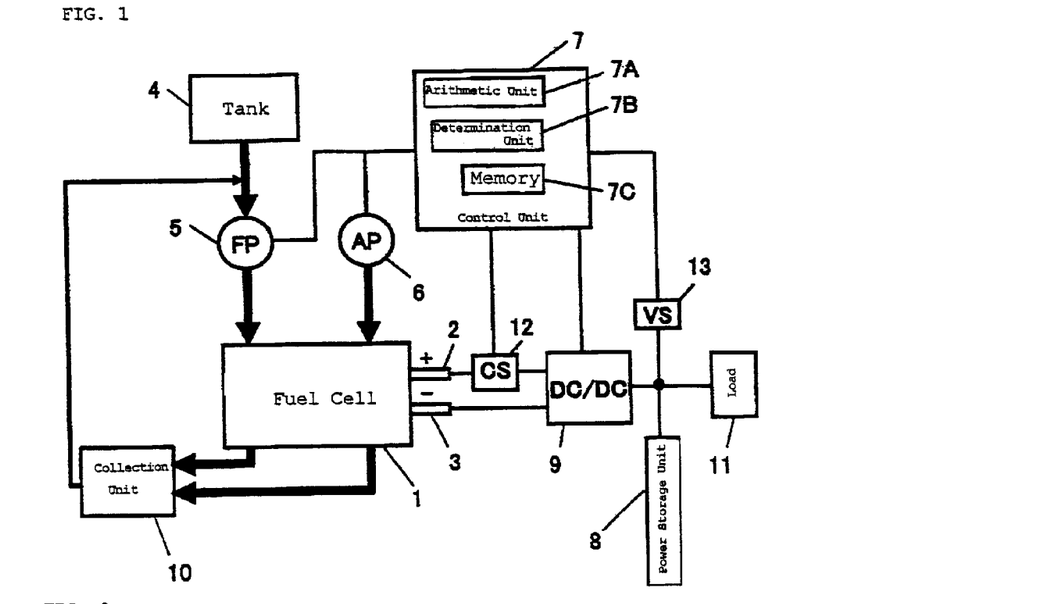
FIG. 1 is a block diagram schematically showing the structure of a fuel cell system according to one embodiment of the invention.
Figure 2:
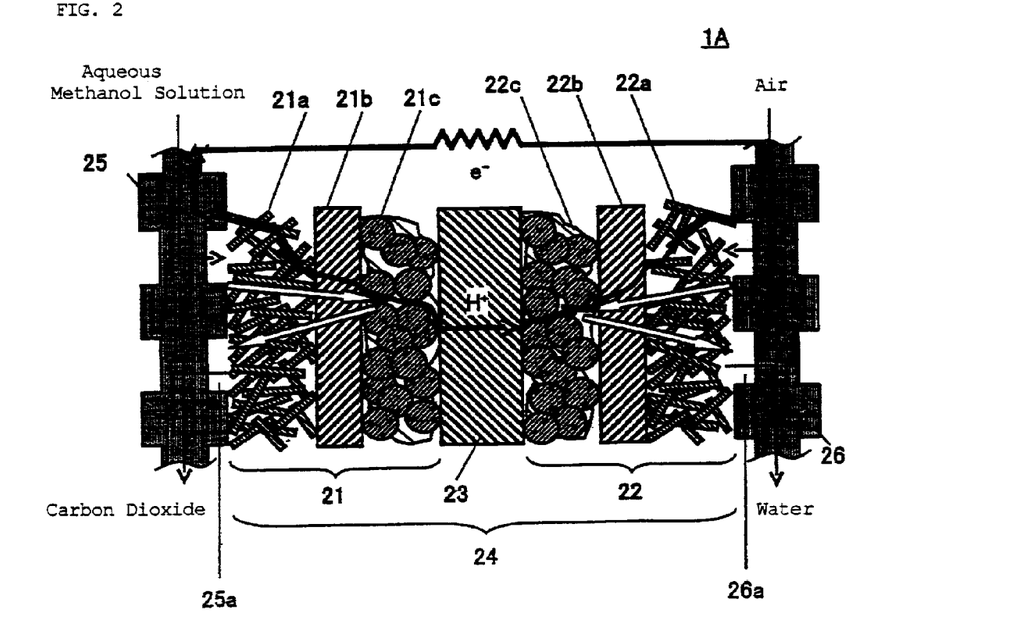
FIG. 2 is a partially enlarged sectional view schematically showing the structure of a fuel cell used in the fuel cell system.

FIG. 1 is a block diagram schematically showing the structure of a fuel cell system according to Embodiment 1 of the invention. FIG. 2 is a partially enlarged sectional view schematically showing the structure of a fuel cell used in the fuel cell system.

A fuel cell system illustrated in FIG. 1 includes: a fuel cell 1; a fuel tank 4 for storing a fuel (in the case of the apparatus illustrated therein, methanol); a fuel pump (FP) 5 for supplying a mixture (aqueous methanol solution) of the fuel from the fuel tank 4 and water from a collection unit (gas-liquid separation unit) 10 to the fuel cell 1; an oxidant pump (AP) 6 for supplying an oxidant (in the case of the apparatus illustrated therein, oxygen in air) to the fuel cell 1; and the collection unit 10 for separating unreacted fuel and water from the effluent from the fuel cell 1 and supplying them to the pump 5. The fuel cell 1 has a positive terminal 2 and a negative terminal 3.

The fuel cell system further includes: a control unit 7 equipped with an arithmetic unit 7A, a determination unit 7B, and memory 7C; a power storage unit 8 for storing electrical output of the fuel cell 1; a DC/DC converter 9 for converting the voltage of the electrical output of the fuel cell 1 and transmitting it to the power storage unit 8 and the load 11; a current sensor (CS) 12 for detecting output current of the fuel cell 1; and a voltage sensor (VS) 13 for detecting output voltage of the DC/DC converter 9. The signal detected by the current sensor 12 and the signal detected by the voltage sensor 13 are inputted into the control unit 7. The current sensor 12 can be connected to, for example, wiring connecting the external positive terminal 2 and the DC/DC converter 9, in such a manner that the current sensor 12 and the DC/DC converter 9 are connected in series. When a non-contact current sensor is used as the current sensor 12, the sensor can be disposed, for example, near the wiring connecting the external positive terminal 2 and the DC/DC converter 9.

The control unit 7 controls the DC/DC converter 9 to control the voltage outputted to the load 11 and the charge/discharge of the power storage unit 8, while it controls the fuel pump 5 and the oxidant pump 6 to control the amounts of fuel and oxidant supplied to the fuel cell 1. The control unit 7 can be composed of a CPU (Central Processing Unit), a micro computer, an MPU (Micro Processing Unit: micro processor), main memory, auxiliary memory, etc.

The memory 7C (e.g., nonvolatile memory) for the control unit 7 stores data on the voltage-current characteristics of the fuel cell 1 according to the amount of fuel supplied and data on the greatest amount of power generated by the fuel cell 1 according to the amount of fuel supplied, which are described below (see FIG. 7).

The control method of the DC/DC converter 9 is preferably the PWM (Pulse Width Modulation) control method in which the output voltage is adjusted by modulating the pulse width (duty ratio) while keeping the switching pulse frequency constant, because it provides a small ripple voltage and a quick response. Thus, in the fuel cell system illustrated therein, the DC/DC converter 9 is a PWM control method DC/DC converter, more specifically, a boost converter.

Referring now to FIG. 2, the fuel cell is described. The fuel cell 1 includes at least one cell (unit cell). FIG. 2 illustrates the structure of a unit cell.

A unit cell 1A has a membrane electrode assembly (MEA) 24 where power is generated. It should be noted that a fuel cell is typically composed of a plurality of stacked MEAs 24 and that the MEAs 24 are stacked with separators 25 and 26 interposed therebetween. Both ends of the stack of the MEAs 24 (cell stack) in the stacking direction are fitted with an anode-side end plate and a cathode-side end plate, not shown, respectively.

Each MEA 24 includes an anode (electrode) 21, a cathode (electrode) 22, and an electrolyte membrane 23 interposed between the anode 21 and the cathode 22.

The anode 21 includes an anode diffusion layer 21a, an anode microporous layer (MPL) 21b, and an anode catalyst layer 21c. The anode catalyst layer 21c is laminated on the electrolyte membrane 23, the anode MPL 21b is laminated thereon, and the anode diffusion layer 21a is laminated thereon. The separator 25 is in contact with the anode diffusion layer 21a.

Likewise, the cathode 22 includes a cathode diffusion layer 22a, a cathode microporous layer (MPL) 22b, and a cathode catalyst layer 22c. The cathode catalyst layer 22c is laminated on the electrolyte membrane 23, the cathode MPL 22b is laminated thereon, and the cathode diffusion layer 22a is laminated thereon. The separator 26 is in contact with the cathode diffusion layer 22a.

The anode diffusion layer 21a and the cathode diffusion layer 22a can be formed of carbon paper, carbon felt, carbon cloth, etc. The anode MPL 21b and the cathode MPL 22b can be composed of polytetrafluoroethylene or tetrafluoroethylene-hexafluoropropylene copolymer, and carbon.

The anode catalyst layer 21c and the cathode catalyst layer 21c include a catalyst suitable for the electrode reaction, such as platinum or ruthenium. The catalyst is supported on a carbonaceous material by pulverizing the catalyst and highly dispersing the resulting fine particles on the surface of the carbonaceous material. The carbon with the catalyst supported thereon is bound by a binder to form the anode catalyst layer 21c and the cathode catalyst layer 21c.

The electrolyte membrane 23 can be an ion-exchange membrane which allows hydrogen ions to pass through, and can be composed of, for example, a perfluorosulfonic acid-tetrafluoroethylene copolymer.

The separators 25 and 26 can be formed of a conductive material, such as a carbon material. The face of the separator 25 in contact with the anode 21 is provided with a fuel flow channel 25a for supplying a fuel to the anode 21. The face of the separator 26 in contact with the cathode 22 is provided with an oxidant flow channel 26a for supplying an oxidant to the cathode 22. Each of the flow channels 25a and 26a can be formed, for example, by making a groove in the above-mentioned face.

An aqueous solution containing methanol as the fuel is supplied to the anode 21, while air containing oxygen as the oxidant is supplied to the cathode 22. The methanol and steam derived from the aqueous methanol solution supplied to the anode 21 are diffused throughout the anode microporous layer 21b by the anode diffusion layer 21a. Further, they pass through the anode microporous layer 21b and reach the anode catalyst layer 21c. Likewise, the oxygen contained in the air supplied to the cathode 22 is diffused throughout the cathode microporous layer 22b by the cathode diffusion layer 22a. Further, it passes through the cathode microporous layer 22b and reaches the cathode catalyst layer 21c.

Also, in fuel cells, it is common to use oxygen in the air as the oxidant. This oxidant is also supplied to the cathode of each unit cell according the amount of power generation.

The reactions at the anode and cathode of a DMFC are shown by the following reaction formulas (1) and (2), respectively.

$$\text{Anode: } CH_3OH + H_2O \rightarrow CO_2 + 6H^+ + 6e^- \qquad (1)$$

$$\text{Cathode: } (3/2)O_2 + 6H^+ + 6e^- \rightarrow 3H_2O \qquad (2)$$

As shown by the above reaction formulas (1) and (2), carbon dioxide as a reaction product and an aqueous solution of unreacted methanol as the remaining fuel are discharged from the anode 21, while water (steam) as a reaction product and nitrogen and unreacted oxygen in the air are discharged from the cathode 22.

Of the fuel supplied to the anode 21 of the fuel cell 1, surplus fuel is transported as the aqueous methanol solution to the fuel pump 5 from the collection unit 10 without being consumed in the fuel cell 1. Carbon dioxide generated at the anode of the fuel cell 1 is also transported to the collection unit 10, separated from the aqueous methanol solution in the collection unit 10, and discharged to outside.

Meanwhile, the air containing oxygen as the oxidant is pressurized by the oxidant pump 6, and transported to the cathode of the fuel cell 1. At the cathode of the fuel cell 1, water is produced (see the above reaction formula (2)). Of the air supplied to the fuel cell 1, surplus air is mixed with the produced water, and transported as a gas-liquid mixture to the collection unit 10. The air transported to the collection unit 10 is separated from the water, and discharged to outside.

As described above, the concentration of the aqueous methanol solution as the fuel can be adjusted by circulating the liquid components such as the water discharged from the fuel cell 1 by using the collection unit 10. As a result, it is possible to realize a system which does not need to be supplied with water from outside. It is also possible to realize a system which does not need to discard water as the reaction product to outside. It is thus possible to realize a maintenance-free system which requires no maintenance over a long period of time. It is therefore possible to further improve the transportability and portability of the fuel cell system.

Figure 3:
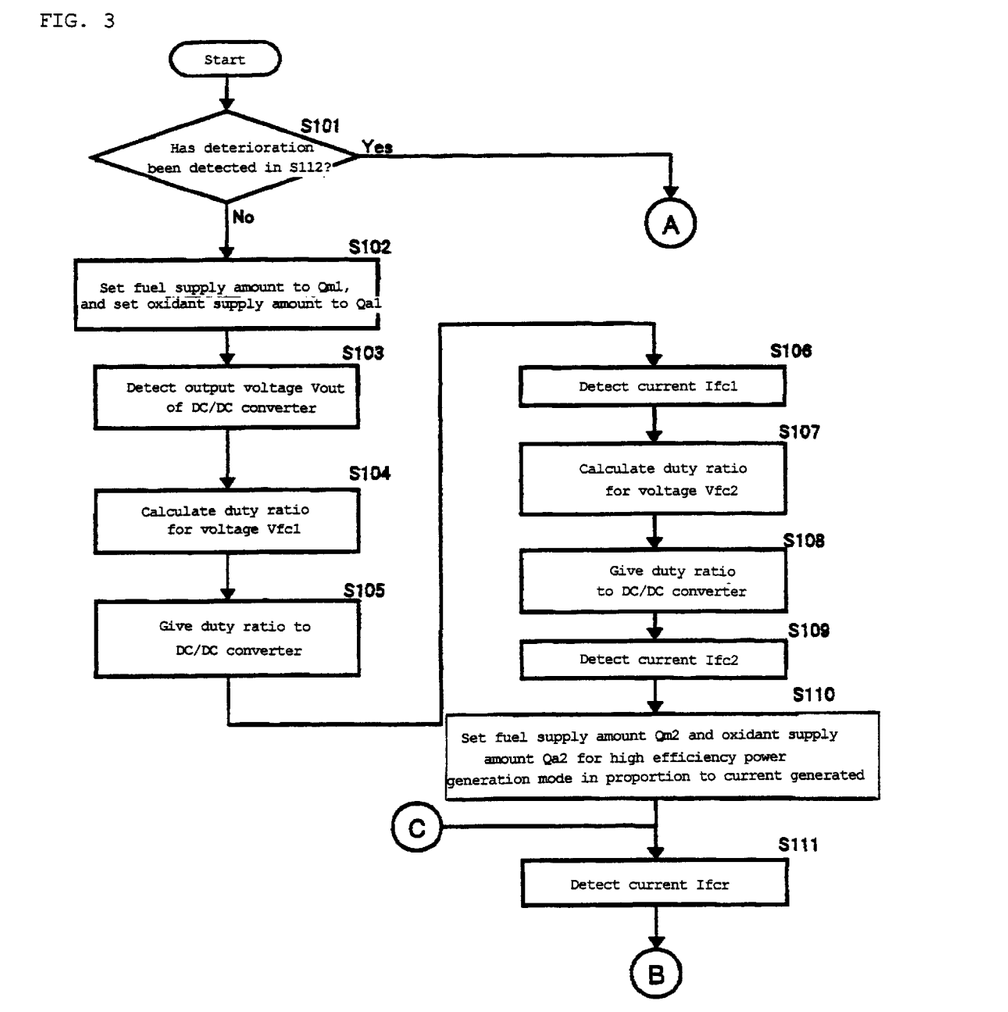
FIG. 3 is a flow chart of a process performed by a control unit.
Figure 4:
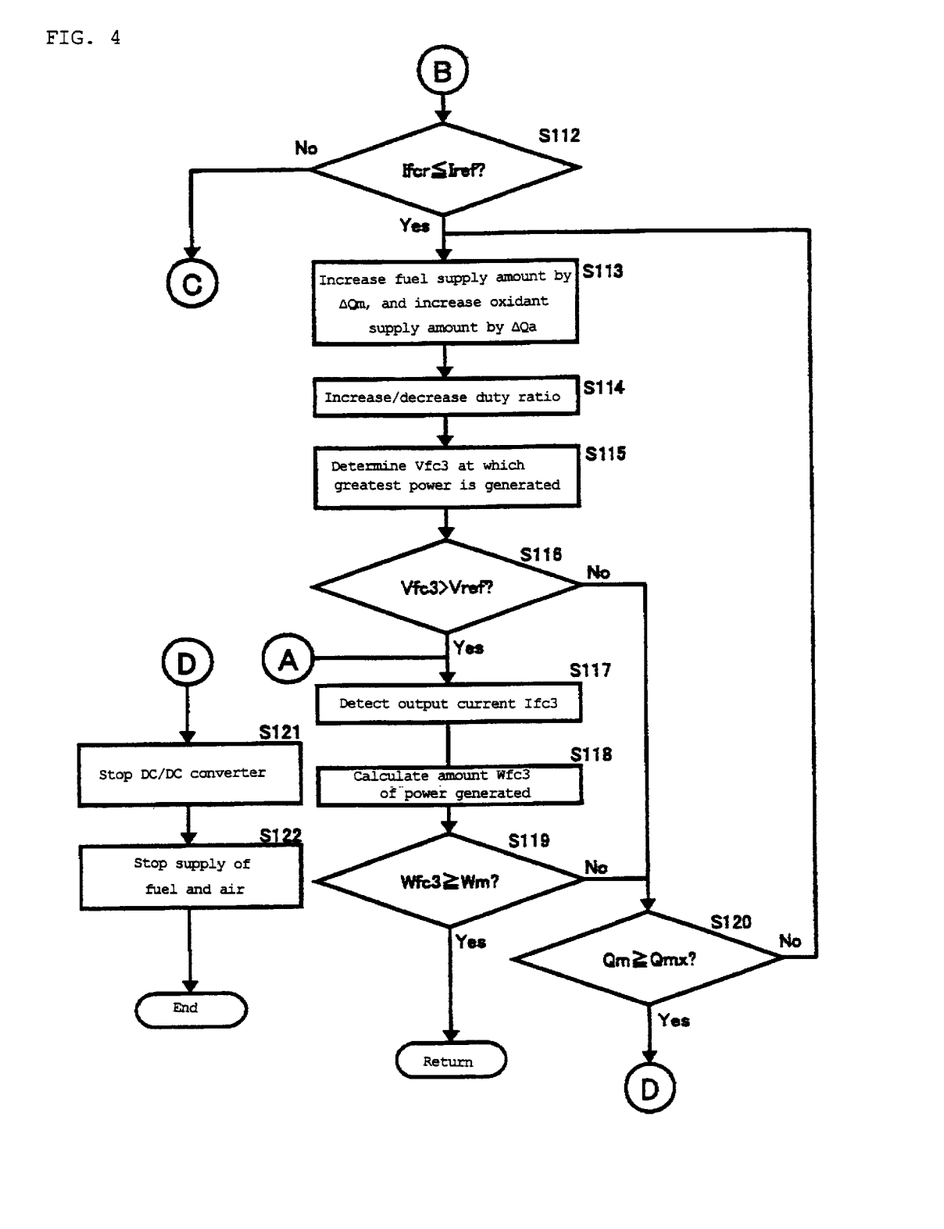
FIG. 4 is a flow chart of another process performed by the control unit.

Referring now to FIG. 3 and FIG. 4, the operation of the fuel cell system based on the control of the control unit is described. FIG. 3 and FIG. 4 are flow charts of the processes performed by the control unit 7. The processes of FIG. 3 and FIG. 4 are started by starting up the fuel cell system.

First, whether or not deterioration of the fuel cell 1 has been detected by the determination of step S112, described below, is determined (step S101). Since the determination result is "No" at first, the fuel supply amount Qm is set so that the fuel is supplied to the anode at a set value Qm1 which has been determined in advance based on the load. Also, the oxidant supply amount Qa is set to a set value Qa1 for oxidant supply amount according to the set value Qm1 (step S102). It is desirable to determine the set value Qm1 so that the amount of power generated by the fuel cell 1 in the initial state in high efficiency power generation mode, described below, is equal to or greater than the amount of power required by the load 11.

Next, the output voltage Vout of the DC/DC converter 9 is detected by the voltage sensor 13 (step S103). Then, the duty ratio of the DC/DC converter 9 for making the output voltage Vfc of the fuel cell 1 the voltage Vfc1 is calculated, (step S104). As used herein, the voltage Vfc1 is the voltage at which the amount of power generated by the not-deteriorating fuel cell 1 in the initial state at the fuel supply amount Qm1 becomes greatest. The calculation of the duty ratio is performed by the arithmetic unit 7A.

The calculation formula for the duty ratio for making the output voltage Vfc of the fuel cell 1 the voltage Vfc1 is shown by the following formula (3). This calculation formula is the calculation formula when the DC/DC converter 9 is a boost converter.

$$V\text{out}/V\!f\!c1 = 1/(1-\text{duty}) \tag{3}$$

where duty represents duty ratio

The relationship between the output voltage Vfc of the fuel cell 1, the output current Ifc thereof, and the amount Wfc of power generated thereby is described.

FIG. 7 is a graph showing the voltage-current characteristics (curve 31) of the not-deteriorating fuel cell 1 in the initial state at a predetermined fuel supply amount (e.g., Qm1) and the relation (curve 32) between the power generation amount Wfc and the output current Ifc.

As shown by the curve 31 in the figure, the output voltage Vfc of the fuel cell 1 decreases as the output current Ifc increases. In the voltage-current characteristics shown therein, when the output current of the fuel cell 1 is Ifcx and the output voltage is Vfcx, the amount Wfc of power generated by the fuel cell 1 reaches the greatest value Wfcx. Thus, when the fuel supply amount is, for example, Qm1, the output voltage Vfc1 at which the amount Wfc of power generated by the fuel cell 1 in the initial state becomes greatest can be determined from the above voltage-current characteristics of the fuel cell 1. Alternatively, the voltage Vfc1 can be measured in advance by using the fuel cell 1 in the initial state. The memory 7C for the control unit 7 stores information on the voltage Vfc1.

Next, the duty ratio calculated in the step S104 is given to the DC/DC converter 9 (step S105). Then, the output current Ifc1 of the fuel cell 1 when the output voltage Vfc of the fuel cell 1 is the voltage Vfc1 is detected by the current sensor 12 (step S106).

Thereafter, a series of operations for switching the operation mode of the fuel cell 1 to high efficiency power generation mode is performed.

First, the duty ratio of the DC/DC converter 9 for making the output voltage Vfc of the fuel cell 1 a voltage Vfc2, which is higher than the voltage Vfc1 by a first predetermined rate Pr1, is calculated by the arithmetic unit 7A (step S107). This calculation is given by the following formula (4).

$$V\text{out}/V\!f\!c2 = 1/(1-\text{duty}) \tag{4}$$

Then, the duty ratio calculated by the step S107 is given to the DC/DC converter 9 (step S108). The output current Ifc2 of the fuel cell 1 when the output voltage Vfc is the voltage Vfc2 is detected by the current sensor 12 (step S109).

Next, the set value Qm2 of fuel supply amount and the set value Qa2 of oxidant supply amount for high efficiency power generation mode are calculated by the arithmetic unit 7A based on the set value Qm1, the set value Qa1, and the ratio of the output current Ifc2 to the output current Ifc1, and the calculated Qm2 and Qa2 are set as the fuel supply amount Qm and the oxidant supply amount Qa (step S110). The calculation formulas are shown by the following formulas (5) and (6).

$$Qm2 = Qm1 \times (Ifc2/Ifc1) \tag{5}$$

$$Qa2 = Qa1 \times (Ifc2/Ifc1) \tag{6}$$

When Vfc2>Vfc1, Ifc2<Ifc1 as is clear from the curve 31 in FIG. 7. Thus, the set value Qm2 is a value smaller than the set value Qm1. Likewise, the set value Qa2 is a value smaller than the set value Qa1.

The set value Qm2 and the set value Qa2 are calculated from the formulas (5) and (6), because the amount of fuel supplied to the fuel cell (the sum of the amount of fuel stoichiometrically necessary according to the load, the amount of crossover methanol, and the amount of fuel discharged from the fuel cell without reacting) is proportional to the output current of the fuel cell. Accordingly, it is common to control the amount of oxidant supplied to the fuel cell so that it is proportional to the output current of the fuel cell.

Next, the output current Ifcr of the fuel cell 1 with the fuel supply amount being Qm2 and the output voltage being Vfc2 is detected by the current sensor 12 (step S111). The output current Ifcr is compared with a reference value Iref for determining mild deterioration by the determination unit 7B to determine whether the output current Ifcr is equal to or less than the reference value Iref (step S112).

If Ifcr is equal to or less than Iref, it is assumed that mild deterioration of the fuel cell 1 has been detected, and the process proceeds to the step S113 and subsequent steps. If Ifcr is more than Iref, it is assumed that the fuel cell 1 has not deteriorated, and the process returns to the above step S111 to continue the operation of high efficiency power generation mode.

Referring now to FIG. 8, the principle behind the operations of the steps S107 to S112 is explained.

FIG. 8 is a graph showing the voltage-current characteristics of the fuel cell, in which a curve 33 represents the voltage-current characteristics of the not-deteriorating fuel cell 1 in the initial state with the fuel supply amount set to Qm1. A curve 34 represents the voltage-current characteristics of the fuel cell 1 in the initial state with the fuel supply amount set to Qm2. A curve 35 represents the voltage-current characteristics of the fuel cell 1 which has deteriorated mildly, with the fuel supply amount set to Qm2.

As can be seen from the comparison between the curve 33 and the curve 34, the fuel cell 1 in the initial state has almost the same voltage-current characteristics, regardless of whether the fuel supply amount is Qm1 or Qm2, until the output current reaches a certain current value (in the illustrated example, Ifc2$x$) which is smaller than Ifc1$x$ (Ifc1$x$ is the output current at which the amount of power generated by the fuel cell 1 in the initial state becomes greatest). Thus, even when the fuel supply amount is decreased from Qm1 to Qm2, if the output voltage Vfc is set to a suitable voltage (e.g., Vfc2), the output current decreases, so that the power generation efficiency is heightened. As such, the amount Wfc of power generated (in the illustrated example, Vfc2×Ifc2$x$) can be maintained at a value almost equal to the greatest output (Vfc1×Ifc1$x$) at the fuel supply amount of Qm1. Therefore, in the case of the fuel cell 1 in the initial state, by setting the output voltage to the voltage Vfc2 which is slightly higher than the voltage Vfc1 at which the amount of power generation becomes greatest, it is possible to decrease the fuel supply amount without decreasing the amount of power generation so much. That is, high efficiency power generation becomes possible.

However, if the fuel cell 1 deteriorates, the voltage-current characteristics change as the curve 35. As a result, as is clear from the graph, if the output voltage Vfc of the fuel cell 1 remains set to the voltage Vfc2, the output current Ifc decreases significantly to Ifc2$y$. As a result, the amount Wfc of power generation also decreases significantly. The reference value Iref for determining mild deterioration is set to a value at which the supply of power to the load 11 is prevented from being hampered by the decrease in the amount Wfc of power generated by the fuel cell 1 as described above.

In setting the output voltage of the fuel cell 1 to the voltage Vfc2 slightly higher than the voltage Vfc1 by the first predetermined rate Pr1, the rate Pr1 is preferably set to 5 to 30%. Since the characteristics of the fuel cells 1 vary from cell to cell, if Pr1 is set to less than 5%, the effect of heightening the efficiency may not be obtained. However, if Pr1 exceeds 30%, the effect of heightening the efficiency is heightened, but the amount Wfc of power generation decreases too much. As a result, the amount of power required by the load 11 may not be supplied.

It is preferable to set the reference value Iref for determining mild deterioration to a current which is 3 to 20% smaller than the output current Ifcr or Ifc2 measured in advance using the fuel cell 1 in the initial state. In consideration of the variations in the characteristics of the fuel cells 1 and the variations in the performance of auxiliary devices (e.g., fuel pump 5, oxidant pump 6, and DC/DC converter 9) necessary for the operation of the fuel cell system, if the difference between Iref and Ifcr or Ifc2 is less than 3%, a wrong determination that the fuel cell 1 has deteriorated may be made. However, if the difference therebetween exceeds 20%, severe deterioration is included, which is not mild deterioration.

If mild deterioration has been detected in the step S112 ("Yes" in the step S112), the fuel supply amount and the oxidant supply amount are increased by ΔQm and ΔQa, respectively (step S113). And, the duty ratio of the DC/DC converter 9 is increased/decreased in a predetermined range (step S114) to determine the voltage Vfc3 at which the amount Wfc of power generated by the fuel cell 1 becomes greatest with the fuel supply amount Qm increased by ΔQm (step S115). ΔQm is a value sufficiently smaller than the difference between the set value Qm1 and the set value Qm2. ΔQa is a value sufficiently smaller than the difference between the set value Qa1 and the set value Qa2.

At this time, a warning that the fuel cell 1 has deteriorated mildly may be given to the user, for example, by turning on a warning light, if the load 11 has a warning light using an LED (Light Emitting Diode) or the like, or indicating an error in a display if the load 11 has a display such as a liquid crystal monitor.

Next, whether or not the voltage Vfc3 is higher than a reference value Vref for determining severe deterioration is determined by the determination unit 7B (step S116). The reference value Vref is preferably a voltage that is 35 to 45% of the voltage Vfc2. If this ratio is lower than 35%, the voltage boost ratio of the DC/DC converter 9 becomes too large, so that the conversion efficiency of the DC/DC converter 9 decreases and the overvoltage loss may increase significantly. On the other hand, if the ratio exceeds 45%, a wrong determination that the fuel cell 1 has deteriorated severely may be made when the power generation capacity of the fuel cell 1 has not deteriorated to the extent that it is unusable.

If the determination result of the step S116 is "No", there is a possibility that the fuel cell 1 has deteriorated severely, and the process proceeds to the step S120 described below. If the determination result of the step S120 is "Yes", it is assumed that the fuel cell 1 has deteriorated severely, and the operation of the DC/DC converter 9 is stopped (step S121) to stop the power generation of the fuel cell 1. And, the fuel pump 5 and the oxidant pump 6 are stopped to stop the supply of fuel and oxidant to the fuel cell 1 (step S122), to complete the process. At this time, replacement of the fuel cell 1 may be indicated to the user, for example, by turning on a warning light, if the load 11 has a warning light using an LED or the like, or indicating an error in a display if the load 11 has a display such as a liquid crystal monitor.

If the determination result of the step S116 is "Yes", it is assumed that severe deterioration of the fuel cell 1 has not been detected, and the output current Ifc3 at that time is detected by the current sensor 12 (step S117). Then, the amount Wfc3 of power generated by the fuel cell 1 is calculated from Vfc3 and Ifc3 (step S118).

Thereafter, whether or not the calculated amount Wfc3 of power generation is equal to or more than the power Wm required by the load 11 is determined by the determination unit 7B (step S119). If Wfc is equal to or more than Wm ("Yes" in the step S119), the process returns to the step S101. At this time, in the step S101, it is determined that deterioration has been detected in the step S112, so the process proceeds from the step S101 to the step S117 to continue the operation of the fuel cell 1 at the voltage Vfc3.

If Wfc3 is less than Wm ("No" in the step S119), whether or not the fuel supply amount Qm has reached a predetermined upper limit value Qmx is determined (step S120).

If the fuel supply amount has reached the predetermined upper limit value Qmx ("Yes" in the step S120), since the fuel supply amount cannot be increased any more, the process proceeds to the step S121 and subsequent step to stop the power generation of the fuel cell 1. If the fuel supply amount has not reached the predetermined upper limit value Qmx ("No" in the step S120), the process returns to the step S113. It should be noted that when the fuel supply amount has reached the predetermined upper limit value Qmx, even if Wfc3 is less than Wm, the operation of the fuel cell 1 at the upper limit value Qmx can be continued unless a determination that the voltage Vfc3 is equal to or less than the reference value Vref for determining severe deterioration is made in the step S116.

As described above, the fuel supply amount and the oxidant supply amount are increased by $\Delta Qm$ and $\Delta Qa$, respectively, within a range of the fuel supply amount not exceeding the upper limit value, until Wfc3 reaches Wm or more. The reason why the upper limit is set for the fuel supply amount is that an increase in the fuel supply amount results in an increase in methanol crossover (MCO), which is permeation of the fuel methanol together with water through the electrolyte membrane from the anode side to the cathode side. When methanol crossover increases, the fuel burns directly at the cathode, so that the fuel loss increases and the efficiency decreases. Also, the cathode potential decreases. The upper limit value Qmx for fuel supply amount is determined from the above-described viewpoint. Herein, it is also possible to cause the memory 7C to store that deterioration has been detected in the step S112 and the fuel supply amount when the Wfc3 reaches Wm or more and, after the operation of the fuel cell 1 is stopped and when the operation of the fuel cell 1 is resumed, to start the operation of the fuel cell 1 at the stored fuel supply amount.

Figure 9:
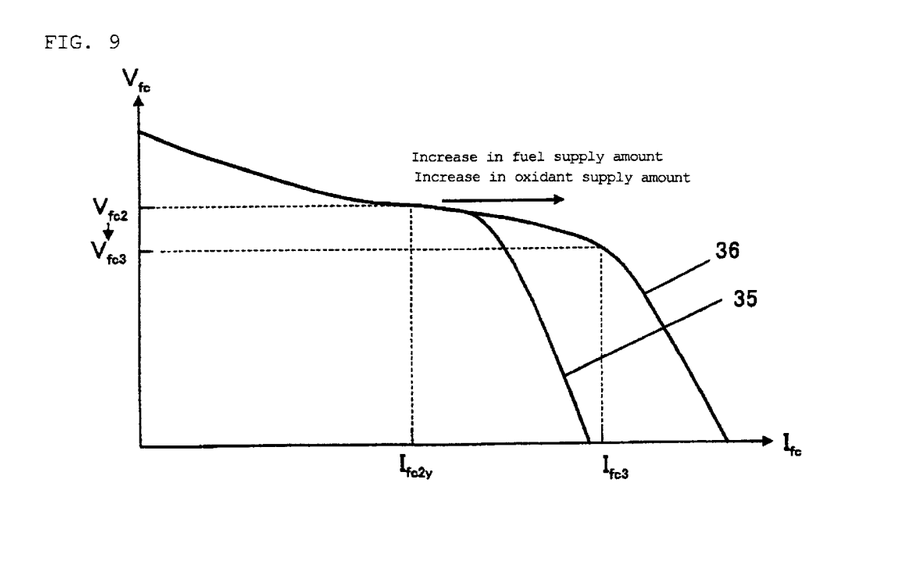
FIG. 9 is a graph showing a change in voltage-current characteristics of a deteriorated fuel cell when the fuel supply amount is increased.

Referring now to FIG. 9, the principle behind the operations of the above steps S112 to S122 is explained.

FIG. 9 is a graph similar to FIG. 8. A curve 35 represents the voltage-current characteristics of the fuel cell 1 whose deterioration has been detected in the step S112, with the fuel supply amount set to Qm2, while a curve 36 represents the voltage-current characteristics of the fuel cell 1, with the fuel supply amount increased to a sufficient supply amount (Qm3) within the upper limit.

As is clear from the comparison between the curve 35 and the curve 36, even when the fuel supply amount is simply increased from Qm2 to Qm3, if the output voltage remains unchanged from Vfc2, the amount of power generation hardly increases from (Vfc2×Ifc2y). Ifc2y is the output current of the fuel cell 1 which has deteriorated mildly, with the fuel supply amount set to Qm2 and the output voltage set to the voltage Vfc2. Therefore, when the fuel supply amount is increased by $\Delta Qm$ in the step S113, the duty ratio of the DC/DC converter 9 needs to be increased/decreased in a predetermined range in the step S114 to find the output voltage Vfc3 (Vfc3<Vfc2) at which the amount of power generation becomes greatest at that fuel supply amount. In this manner, the amount of power generation can be effectively increased according to the amount of increase in the fuel supply amount.

As described above, according to the processes of FIG. 3 and FIG. 4, when the fuel cell 1 has not deteriorated, the output voltage is set to a voltage slightly higher than the voltage at which the amount of power generation becomes greatest, so that the fuel cell 1 is operated in high efficiency mode in which the fuel supply amount is small. On the other hand, if the fuel cell 1 has deteriorated mildly and the amount of power generation has decreased by a predetermined amount or more, the output voltage is set to the voltage at which the amount of power generation becomes greatest, and the fuel supply amount is gradually increased until the necessary amount of power can be generated. If the necessary amount of power cannot be generated even when the fuel supply amount is increased to the predetermined upper limit value, the operation of the fuel cell 1 is stopped.

By the above-described processes, when the fuel cell 1 is in the initial state, the fuel supply amount can be minimized to reduce the operation cost of the fuel cell 1. On the other hand, if the fuel cell 1 has deteriorated mildly, the fuel supply amount is increased, according to the degree of the deterioration, to such a minimum amount that the necessary amount of power can be generated, so that the operation of the fuel cell 1 can be continued while the amount of fuel consumption is reduced.

(Embodiment 2)

Embodiment 2 of the invention is hereinafter described. Embodiment 2 is an alternation of Embodiment 1 and is different from Embodiment 1 only in the control performed by the control unit 7. Only the difference is described below.

Figure 5:
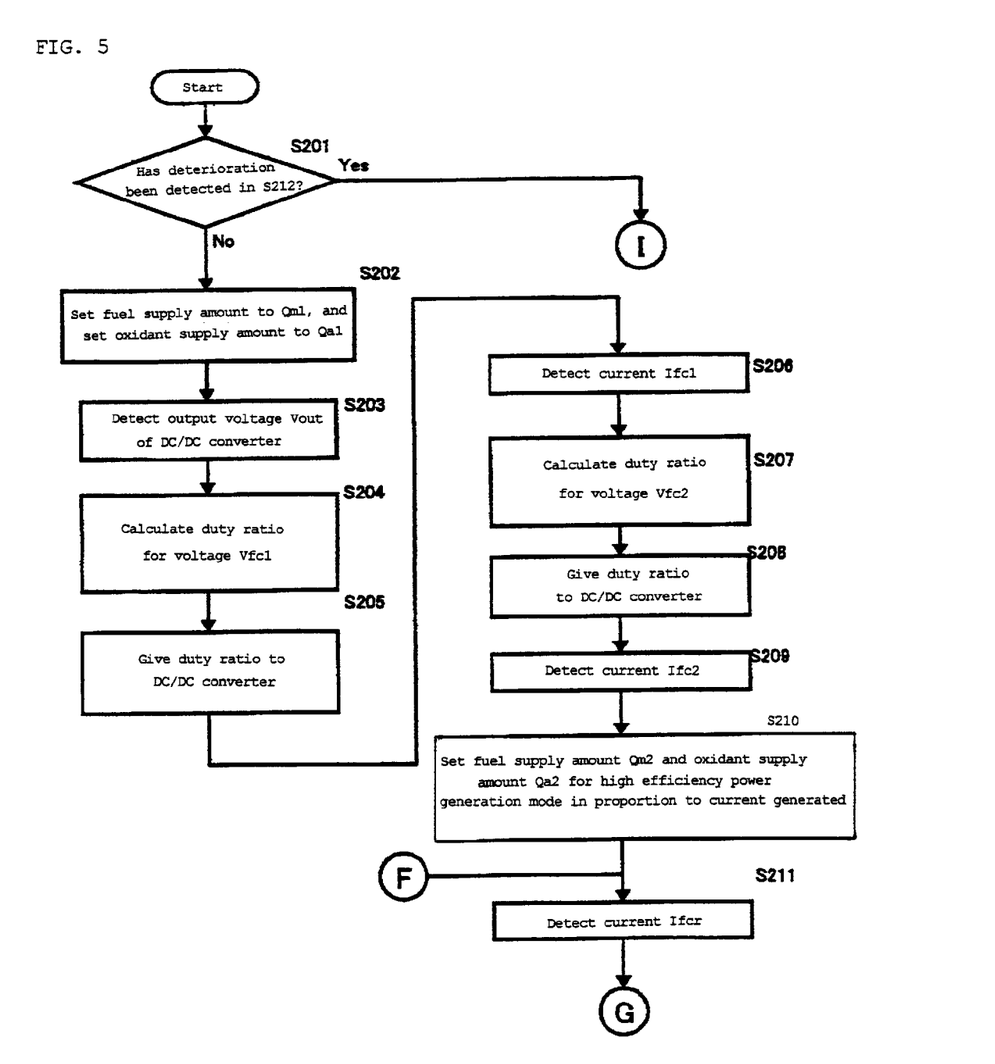
FIG. 5 is a flow chart of a process performed by a control unit in a modified embodiment.
Figure 6:
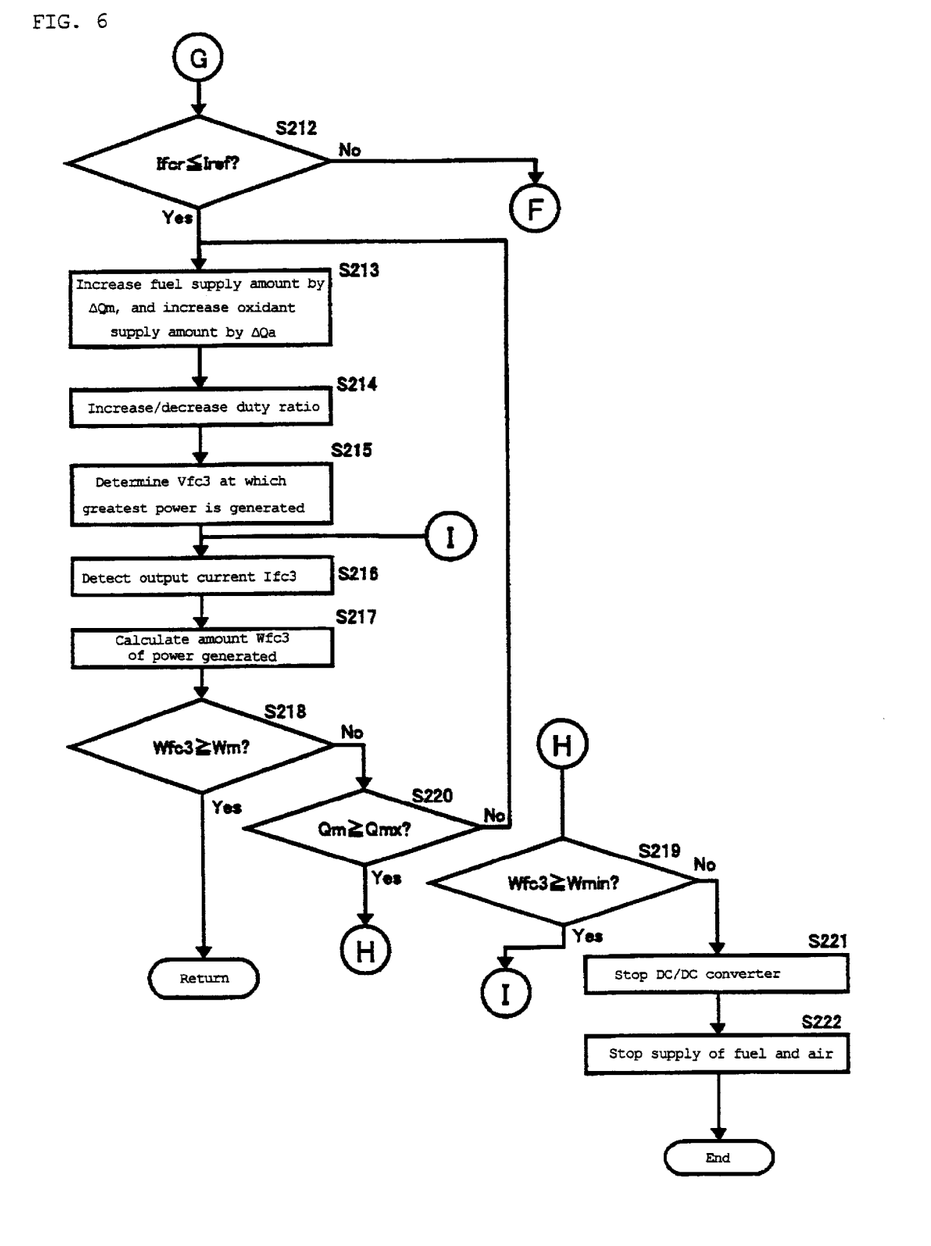
FIG. 6 is a flow chart of another process performed by the control unit in the modified embodiment

FIG. 5 and FIG. 6 are flow charts of the processes performed by the control unit of the fuel cell of Embodiment 2. Since the process of FIG. 5 (steps S201 to S211) is the same as that of FIG. 3 (steps S101 to S111), the description thereof is omitted.

In the steps S212 to S215 of FIG. 6, the voltage Vfc3 is set in the same manner as the process of the steps S112 to S115 of FIG. 4.

Then, the output current Ifc3 at that time is detected by the current sensor 12 (step S216). And, the amount Wfc3 of power generated by the fuel cell 1 is calculated from the voltage Vfc3 and the current Ifc3 (step S217).

Next, the calculated amount Wfc3 of power generation is compared with the power Wm required by the load 11 (step S218), and if Wfc3 is equal to or more than Wm ("Yes" in the step S218), the process returns to the step S201. In the step S201, it is determined that deterioration has been detected in the step S212, so the process proceeds from the step S201 to the step S216. If Wfc3 is less than Wm ("No" in the step S218), whether or not the fuel supply amount Qm has reached the predetermined upper limit value Qmx is determined (step S220). If Qm has not reached Qmx ("No" in the step S220), the process returns to the step S213. If Qm has reached Qmx ("Yes" in the step S220), since the fuel supply amount cannot be increased any more, whether or not Wfc3 is greater than the minimum power Wmin necessary for operation of the fuel cell system, i.e., the power required by the auxiliary devices necessary for operation of the fuel cell system, is determined (step S219). If Wfc3 is not greater that Wmin ("No" in the step S219), the operation of the DC/DC converter 9 is stopped (step S221) to stop the power generation of the fuel cell 1.

Then, the fuel pump 5 and the oxidant pump 6 are stopped to stop the supply of fuel and oxidant to the fuel cell 1 (step S222), to complete the process. At this time, replacement of the fuel cell 1 may be indicated to the user, for example, by turning on a warning light, if the load 11 has a warning light using an LED or the like, or indicating an error in a display if the load 11 has a display such as a liquid crystal monitor.

If Wfc3 is greater than Wmin ("Yes" in the step S219), the process returns to the step S216.

In this manner, the fuel supply amount and the oxidant supply amount are increased by $\Delta Qm$ and $\Delta Qa$, respectively, within a range of the fuel supply amount not exceeding the upper limit value, until Wfc3 reaches Wm or more. Also, even when Wfc3 does not reach Wm or more, as long as Wfc3 is equal to or greater than Wmin, power generation is continued. In this manner, the charge of the power storage unit 8 can be continued.

Herein, it is also possible to cause the memory 7C to store that deterioration has been detected in the step S212 and the fuel supply amount when the Wfc3 reaches Wm or more and, after the operation of the fuel cell 1 is stopped and when the operation 1 of the fuel cell is resumed, to start the operation of the fuel cell 1 at the stored fuel supply amount. When Wfc3 is less than Wm and more than Wmin, after the operation of the fuel cell 1 is stopped and when the operation of the fuel cell 1 is resumed, it is also possible to start the operation of the fuel cell 1 with the fuel supply amount set to Qmx.

Also, this embodiment has been described, taking the DMFC as an example, but is not limited thereto. Any fuel cell using a power generation device similar to a cell stack can be used for the configuration of the invention. For example, the so-called solid polymer electrolyte fuel cells using hydrogen as the fuel and reformed methanol fuel cells may be used. Also, the control method of the fuel cell has been described, taking the constant voltage control method as an example, but the constant current control method can also be used. Further, the DC/DC converter 9 has been described, taking the boost converter as an example, but is not limited thereto. It is also possible to use a buck converter, a buck-boost converter, or an inverting converter.

[Industrial Applicability]

The fuel cell system of the invention is widely useful as the power supply system for back-up purpose and the power supply system for various electronic devices such as personal computers.

[Reference Signs List]
1 Fuel Cell
5 Fuel Pump
6 Oxidant Pump
7 Control Unit
7a Arithmetic Unit
7b Determination Unit
8 Power Storage Unit
9 Dc/Dc Converter
11 Load
12 Current Sensor
13 Voltage Sensor
21 Anode
22 Cathode

The invention claimed is:

1. A method for controlling a fuel cell system comprising: a fuel cell having an anode and a cathode; a fuel supply unit for supplying a fuel to the anode; an oxidant supply unit for supplying an oxidant to the cathode; and a current sensor for detecting an output current of the fuel cell,
the control method comprising the steps of:
(a) setting the amount of fuel supplied to the fuel cell by the fuel supply unit to a second set value Qm2 smaller than a first set value Qm1 determined based on a load;
(b) detecting an output current Ifcr of the fuel cell with the fuel supply amount set to the second set value Qm2;
(c) comparing the output current Ifcr with a reference value Iref for determining mild deterioration to determine whether the fuel cell has deteriorated; and
(d) in the case of determining that the fuel cell has deteriorated, resetting the fuel supply amount to a third set value Qm3 larger than the second set value Qm2.

2. The method for controlling a fuel cell system in accordance with claim 1, wherein the step (a) comprises the steps of:
(e) setting the fuel supply amount to the first set value Qm1;
(f) with the fuel supply amount set to the first set value Qm1, setting the output voltage of the fuel cell to a voltage Vfc1 at which the amount of power generated by the fuel cell becomes greatest;
(g) detecting an output current Ifc1 of the fuel cell when the output voltage of the fuel cell is the voltage Vfc1;
(h) setting the output voltage of the fuel cell to a voltage Vfc2 higher than the voltage Vfc1 by a first predetermined rate Pr1;
(i) detecting an output current Ifc2 of the fuel cell when the output voltage of the fuel cell is the voltage Vfc2; and
(j) determining the second set value Qm2 based on the ratio between the output current Ifc1 and the output current Ifc2.

3. The method for controlling a fuel cell system in accordance with claim 1, wherein the step (d) comprises the steps of:
(k) increasing the fuel supply amount by a predetermined amount ΔQ;
(l) with the fuel supply amount increased by the predetermined amount ΔQ, setting the output voltage of the fuel cell to a voltage Vfc3 at which an amount Wfc of power generated by the fuel cell becomes greatest;
(m) detecting an output current Ifc3 of the fuel cell when the output voltage of the fuel cell is the voltage Vfc3; and
(n) comparing an amount Wfc3 of power generated by the fuel cell, which is determined from the results of the steps (l) and (m), with an amount Wm of power required by the load,
wherein when Wfc3 has reached Wm, the fuel supply amount is maintained, and when Wfc3 has not reached Wm, the steps (k) to (n) are repeated within a range of the fuel supply amount not exceeding an upper limit value Qmx.

4. The method for controlling a fuel cell system in accordance with claim 3, further comprising the step (o) of comparing the voltage Vfc3 with a reference value Vref for determining severe deterioration,
wherein even when the fuel supply amount has reached the upper limit value Qmx, if Vfc3 does not exceed Vref, the supply of fuel by the fuel supply unit and the supply of oxidant by the oxidant supply unit are stopped.

5. The method for controlling a fuel cell system in accordance with claim 3, further comprising the step (p) of comparing the amount Wfc3 of power generation with a minimum amount Wmin of power necessary for the operation of the fuel cell system where Wmin <Wm,
wherein when the fuel supply amount has reached the upper limit value Qmx, if Wfc3 has reached Wmin, the fuel supply amount is maintained at the upper limit value Qmx, and
even when the fuel supply amount has reached the upper limit value Qmx, if Wfc3 has not reached Wmin, the supply of fuel by the fuel supply unit and the supply of oxidant by the oxidant supply unit are stopped.

6. The method for controlling a fuel cell system in accordance with claim 2, wherein the first predetermined rate Pr1 is 5 to 30%.

7. The method for controlling a fuel cell system in accordance with claim 1, wherein the reference value Iref for determining mild deterioration is smaller than the current Ifcr or the current Ifc2 of the fuel cell in an initial state by 3 to 20%.

8. The method for controlling a fuel cell system in accordance with claim 1, wherein the fuel includes methanol.

9. The method for controlling a fuel cell system in accordance with claim 8, wherein the first set value Qm1 is set based on the amount of fuel stoichiometrically necessary according to the load, the amount of crossover methanol, and the amount of fuel discharged from the fuel cell without reacting.

10. The method for controlling a fuel cell system in accordance with claim 1, further comprising the step (q) of issuing a warning that the mild deterioration has been detected.

11. The method for controlling a fuel cell system in accordance with claim 4, further comprising the step (r) of issuing a warning that the severe deterioration has been detected.

* * * * *